F. L. PINKHAM.
METHOD OF MAKING WELDED PIPES.
APPLICATION FILED FEB. 8, 1913.
1,108,393.  Patented Aug. 25, 1914.
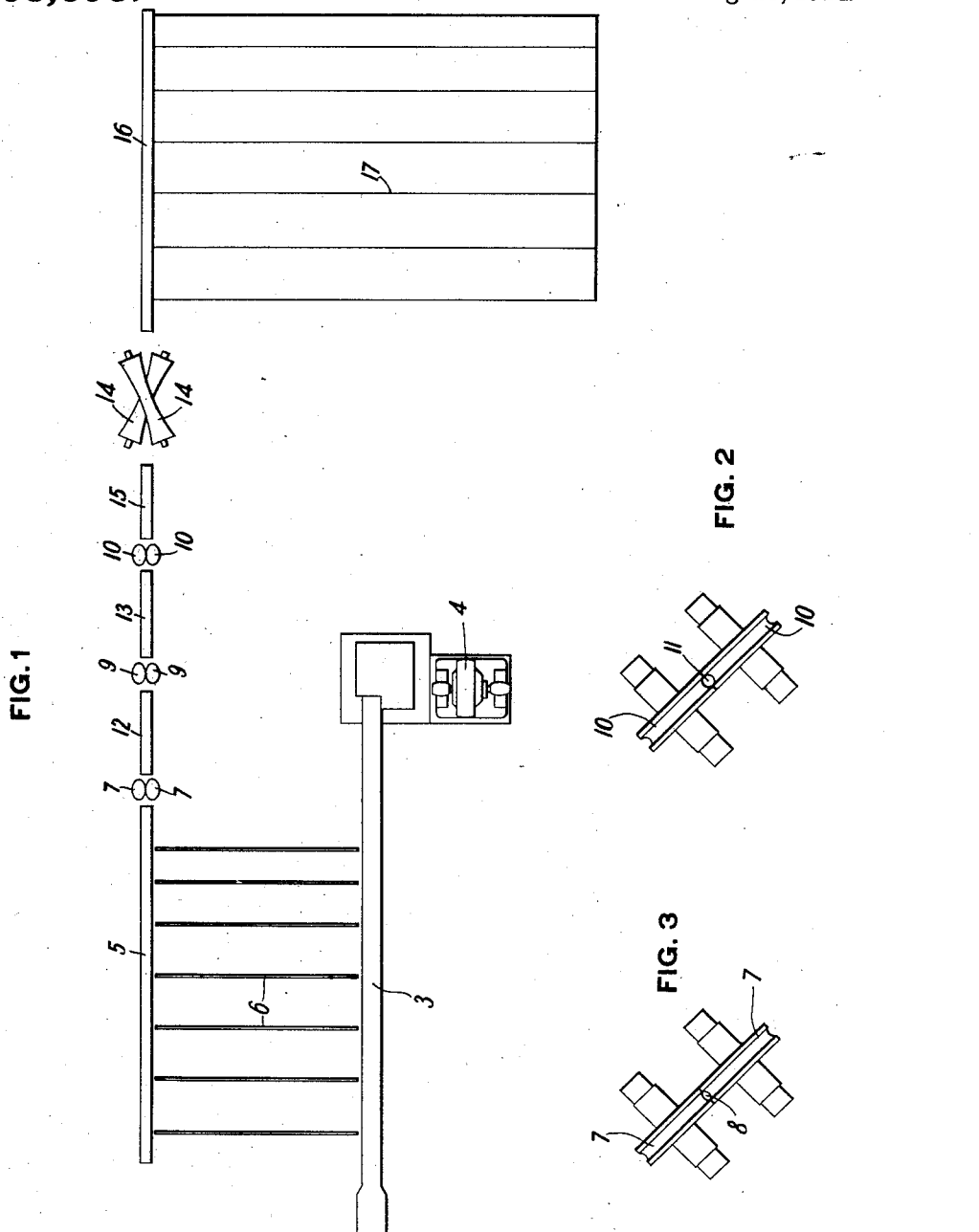
WITNESSES  INVENTOR

UNITED STATES PATENT OFFICE.

FRANK L. PINKHAM, OF WILKINSBURG, PENNSYLVANIA, ASSIGNOR TO THE NATIONAL TUBE COMPANY, OF PITTSBURGH, PENNSYLVANIA, A CORPORATION OF NEW JERSEY.

METHOD OF MAKING WELDED PIPES.

1,108,393.   Specification of Letters Patent.   Patented Aug. 25, 1914.

Application filed February 8, 1913. Serial No. 747,020.

*To all whom it may concern:*

Be it known that I, FRANK L. PINKHAM, a citizen of the United States, and resident of Wilkinsburg, in the county of Allegheny and State of Pennsylvania, have invented a new and useful Method of Making Welded Pipes, of which the following is a specification.

My invention relates to the manufacture of welded pipes and tubes, and, while not restricted to such uses, more particularly relates to the manufacture of the smaller sizes of such materials. Heretofore, in the manufacture of welded pipes and tubes, it has been the practice to butt-weld the longitudinal edges of the skelp in making the smaller sizes (up to two inches in diameter) by drawing the skelp through a welding bell. With the larger sizes of pipes and tubes (above three inches in diameter) the longitudinal edges of the skelp are scarfed and bent into cylindrical form with overlapping scarfed edges. The overlapping edges of the bent pipe skelp are, after being heated to a welding temperature, then lap-welded by means of welding rolls, a welding ball being employed in conjunction with the welding rolls to form the internal support required for the inner surfaces of the pipes in making lap-welded pipes. The butt-weld and the lap-weld processes are both employed in making pipes and tubes of from two to three inches in diameter, the particular kind of pipe determining the processes used. The welded pipes, while still heated from the welding operation, are then subjected successively to the action of sizing rolls to fix the external diameter, and cross rolls to straighten the pipes, after which the pipes are cut to length and allowed to cool in readiness to be threaded or to be transferred to a place of storage or shipment.

One object of my invention is to provide an improved method of making welded pipes or tubes in a novel series of steps whereby the pipe skelp is more easily formed into pipe, and the liability of forming pipes having imperfect welds is lessened and prevented.

Another object of the invention is to provide a novel method of making welded pipes by the use of which variations in wall thickness and in the internal and external diameters of the pipes are avoided and prevented and a more uniform product of standard dimensions and having an improved surface finish is produced, and the difficulties met with in making small welded pipes as manufactured heretofore are largely avoided and overcome.

The invention consists in first forming and welding a pipe skelp into a tubular blank of a diameter materially greater than that of the finished pipe, and then, preferably immediately after and while still heated from the welding operation, subjecting the heated tubular blank to the action of the reducing rolls of a rolling mill by which the tubular blank is reduced to the desired standard internal and external diameters and wall thickness or gage and finally cross rolling the pipe to straighten the welded rolled pipes.

Referring to the drawings forming part of this specification, Figure 1 is a plan showing diagrammatically one arrangement of apparatus adapted for use in carrying out my invention. Fig. 2 is a side elevation showing the arrangement of the stands of rolls of the rolling mill having elliptical passes. Fig. 3 is a similar elevation showing the arrangement of the rolls in forming cylindrical passes therebetween.

In the accompanying drawings the numeral 2 designates a welding furnace and 3 is a draw-bench on which the skelp, as removed from the furnace, are formed into tubular blanks by drawing the heated skelp through the welding bell removably secured on the forward or furnace end of the draw-bench. The draw-bench is of the usual known construction having an endless draw-chain positively driven by means of an electric motor 4.

Extending lengthwise parallel with the draw-bench 3 along one side thereof is a trough or conveyer 5 and located between the draw-bench 3 and conveyer 5 is a series of skids forming a transfer table 6 on which the welded skelp or blanks are transferred from the draw-bench to the conveyer 5. At the rear end of the trough or conveyer 5 is a series of sets of two-high rolls forming a continuous rolling mill in which the welded blanks are rolled in carrying out the steps of my improved method.

The rolling mill as shown comprises a pair of reducing rolls 7, 7 having an elliptical reducing pass 8, (as is illustrated in Fig. 3) the axes of the rolls being arranged to extend at an angle to the horizontal, a pair of rolls 9, 9 having an elliptical pass 8 similar to that shown in Fig. 3 with the axes of the rolls 9, 9 extending at the opposite angle to the horizontal to that of the rolls 7, 7 and a third pair of rolls 10, 10 having a cylindrical pass 11 formed therebetween, (as shown in Fig. 2) the axes of the rolls 10, 10 preferably being inclined at an angle to the horizontal as shown.

A trough or conveyer 12 extending lengthwise between the rolls 7 and 9 is employed to deliver the blanks from the rolls 7 to the rolls 9, and a similar trough or conveyer 13 extends between the rolls 9 and 10 for a similar purpose.

On the discharge side of the rolls 10 a stand of cross rolls 14, 14, of the usual known construction is located, by which the pipes are straightened, a conveyer 15 being employed to deliver the pipes from the reducing rolls 10 to the cross straightening rolls 14 and a similar trough or conveyer 16 is employed to receive the pipes delivered from the cross rolls 14.

A series of skids is employed alongside the conveyer 16 to form a receiving table 17 to which the straightened pipes are transferred from the conveyer 16 and are stored until removed to the saws or other apparatus used in cutting the pipes to length, or to a place of storage or shipment.

In carrying out the steps of my improved method the pipe skelp are charged into the welding furnace 2 and, when heated, are successively removed from the welding furnace and drawn through the welding bell positioned on the front or furnace end of the draw-bench 3, the longitudinal edges of the skelp being thereby forced into engagement and welded together to form a tubular blank. The so-formed tubular blanks are of materially larger diameter than that desired in the finished pipe, and may be of somewhat less thickness or gage than is required in the finished pipe.

The so-formed tubular blanks are, preferably immediately after and while still heated from the welding operation, then caused to pass through the stands of reducing rolls 7, 7, 9, 9, and 10, 10, in which the blanks are reduced in diameter to form the pipe to the desired external diameter, the reducing operations in the rolls of the rolling mill upsetting or thickening the wall of the pipe so as to produce or form a pipe having the desired external and internal diameter and wall thickness or gage. The rolled pipes then pass to the trough or conveyer 15 on which they are delivered to the cross straightening rolls 14, 14. The pipes are straightened in the cross rolls 14 and pass therefrom to the trough or conveyer 16 from which they are transferred sidewise to the skids forming the cooling bed 17. The pipes are then transferred from the bed 17 to a saw or other apparatus employed and, after being cut to length, are delivered to a place of storage or shipment.

So far as I am aware, I am the first to disclose a method of making pipes in which the skelp are first welded into blanks of larger diameter than the finished pipe, and the welded tubular blanks are then reduced in a rolling mill to form them to the desired internal and external diameter.

The advantages of my invention will be apparent to those skilled in the art. By means of my improved method the pipe skelp are bent and welded to a diameter greater than that of the finished pipes and are afterward reduced to diameter in a series of reducing rolling passes and in this manner the difficulties heretofore encountered in welding the small sizes of pipes are greatly lessened, the pipes are more accurately formed to diameter and wall thickness, and the finish on the internal and external surfaces is very much better than that obtained by the old method of making such pipes, while the number of defective pipes having imperfect welds and other defects or faults is greatly decreased.

Modifications in the construction and arrangement of the apparatus used in carrying out my invention may be made without departing from my invention as defined in the appended claims.

I claim:

1. The method of making welded pipes which consists in welding a pipe skelp to form a tubular blank having an external diameter materially greater than that of the finished pipe, and then rolling the tubular blank in the reducing pass of a rolling mill to thereby reduce the pipe to diameter.

2. The method of making welded pipes consisting in welding a pipe skelp to form a tubular blank having an external diameter materially greater and a wall thickness less than that of the finished pipe, and then rolling the tubular blank in the reducing pass of a rolling mill to thereby form the pipe to diameter and wall thickness.

3. The method of making welded pipes consisting in welding a pipe skelp to form a tubular blank having internal and external diameters materially greater than those of the finished pipe, and then rolling the welded tubular blank in a rolling mill to thereby reduce the pipe to diameter.

4. The method of making welded pipes which consists in welding a pipe skelp to form a tubular blank having an external diameter materially greater than that of the finished pipe, then rolling the tubular blank in a series of the reducing passes of a rolling mill to thereby reduce the pipe to diameter, and then cross rolling and thereby straightening the rolled pipe.

5. The method of making welded pipes consisting in welding a pipe skelp to form a tubular blank having an external diameter materially greater than that of the finished pipe, then rolling the welded tubular blank to thereby form the pipe to diameter, and then cross rolling and thereby straightening the rolled pipe.

In testimony whereof, I have hereunto set my hand.

FRANK L. PINKHAM.

Witnesses:
 HENRY J. GRAND,
 M. R. EVANS.